Patented Aug. 12, 1924.

1,505,078

UNITED STATES PATENT OFFICE.

CLINTON E. DOLBEAR, OF SAN FRANCISCO, CALIFORNIA, ASSIGNOR TO INDUSTRIAL RESEARCH CO., OF SAN FRANCISCO, CALIFORNIA.

SEPARATION OF ALKALI-METAL SALTS BY AQUEOUS SOLUTION OF AMMONIA.

No Drawing. Application filed August 21, 1923. Serial No. 658,643.

*To all whom it may concern:*

Be it known that I, CLINTON E. DOLBEAR, a citizen of the United States, residing at city and county of San Francisco and State of California, have invented certain new and useful Improvements in Separation of Alkali-Metal Salts by Aqueous Solution of Ammonia, of which the following is a specification.

My invention relates to the art of separation, especially applicable to mixtures of alkali metal salts, to separate one salt from another, or in some cases to segregate some classes of salt from other classes, by the use of an aqueous solution of ammonia. I find that certain of these alkali-metal salts are soluble in strong aqueous ammonia, while others are nearly or quite insoluble therein. Their difference in solubility is utilized in my present process below described.

As an example of the operation of this process, take the mixed alkali metal salts, deposited from the evaporation of a natural brine, such as that found at Searles Lake, California. This brine upon evaporation deposits a mixture of salts containing sodium chloride, sodium sulphate, sodium carbonate, borax, and potassium chloride. Of these salts only sodium chloride and potassium chloride are soluble in strong aqueous ammonia. Consequently, if these mixed salts are leached with strong aqueous ammonia, and then the supernatant solution be separated from the undissolved salts, the chlorides are effectively separated from the carbonate, borates, and sulphates. Under certain conditions when potassium chloride is brought in contact with sodium sulphate in strong ammoniacal solution these salts undergo double decomposition with the formation of the reciprocal salt pair, potassium sulphate and sodium chloride. As the potassium sulphate is quite insoluble in strong aqueous ammonia it will remain undissolved along with the other salts while the sodium chloride is retained in solution and passes along with the ammonia solution upon its separation from the undissolved material.

In practice I use a sufficient amount of strong aqueous ammonia to dissolve all of the aqueous-ammonia-soluble salt or salts contained in the mixture and allow it to remain in contact with the salts until the soluble material all passes into solution. Then I separate the ammoniacal brine from the undissolved material by appropriate means, such as by the use of a filter press or, better still, a closed centrifugal machine. The ammoniacal liquid can then be subjected to distillation and the ammonia thus recovered for further use.

As stated above, under certain conditions the potassium chloride, which is soluble in the strong ammonia solution, will react with the sodium sulphate, and form insoluble potassium sulphate and soluble sodium chloride. However, this reaction is very slow if the aqueous ammonia is sufficiently strong to prevent any of the sodium carbonate or the borax or both from being dissolved. In this case practically all of the potassium is dissolved in the aqueous ammonia, and is separated with the solution from the insoluble material.

From the separated solution this potassium can be recovered by mixing therewith a water solution of sodium sulphate or some other salt that can react with the potassium chloride, to form a potassium compound which is insoluble in the strong ammonia brine.

I claim:

1. The improvement in the separation of alkali-metal salts from each other, which comprises leaching the mixed salts with aqueous ammonia and separating the liquid from the undissolved portion of the salts.

2. The improvement in the separation of alkali-metal salts in solid condition, from each other, which comprises leaching the mixed salts with strong aqueous ammonia, separating the resultant liquid from the undissolved salts, and distilling ammonia from the liquid thus separated.

In testimony whereof I have signed my name to this specification.

CLINTON E. DOLBEAR.